No. 862,596. PATENTED AUG. 6, 1907.
R. H. TRUMBULL.
PANORAMIC CAMERA.
APPLICATION FILED JUNE 30, 1906.
3 SHEETS—SHEET 2.
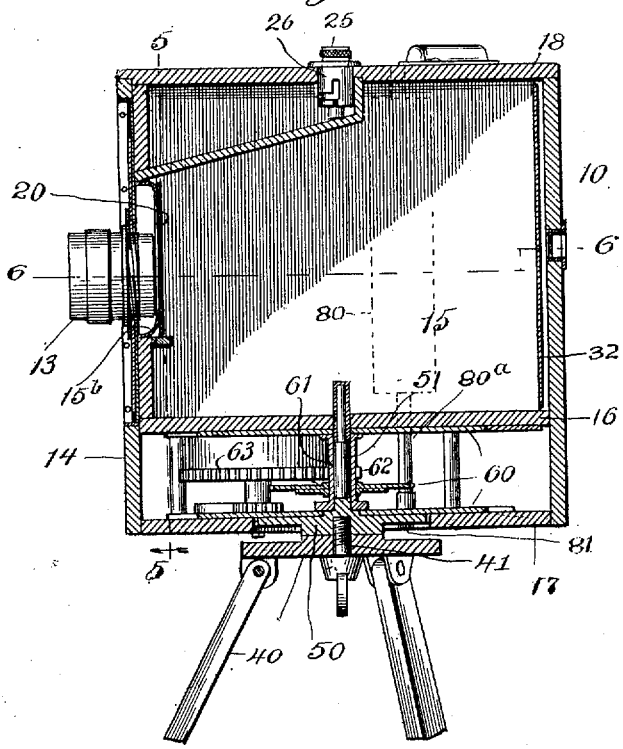
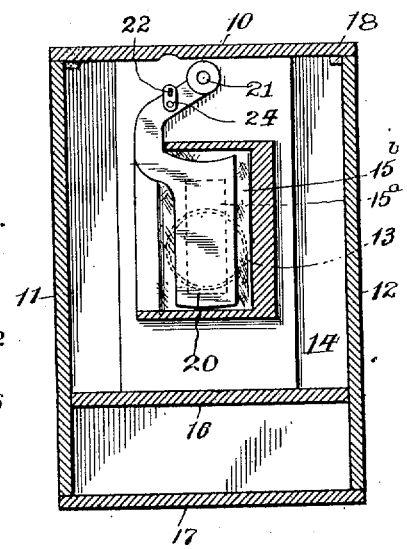
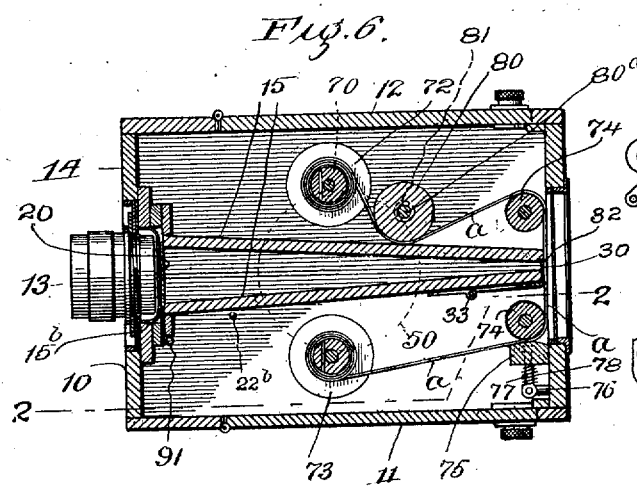
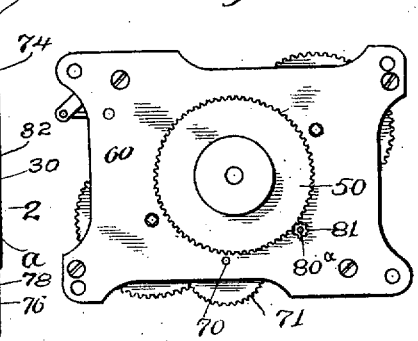
Witnesses:
Wm P. Bond
A. E. Anderson
Inventor:
Rollin H. Trumbull
by Charles O. Sturvey
Atty.

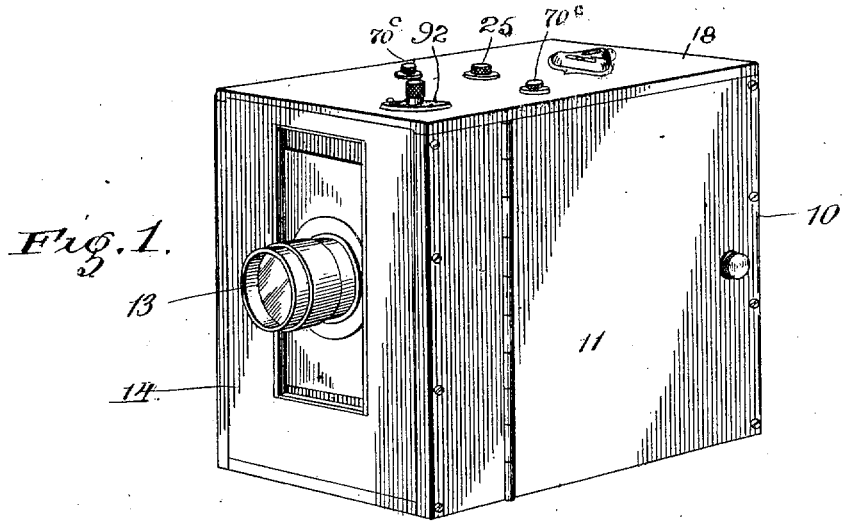
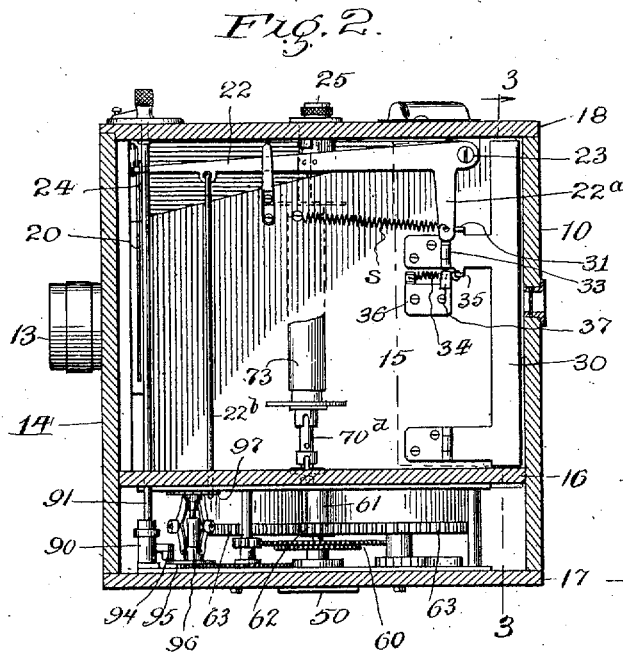
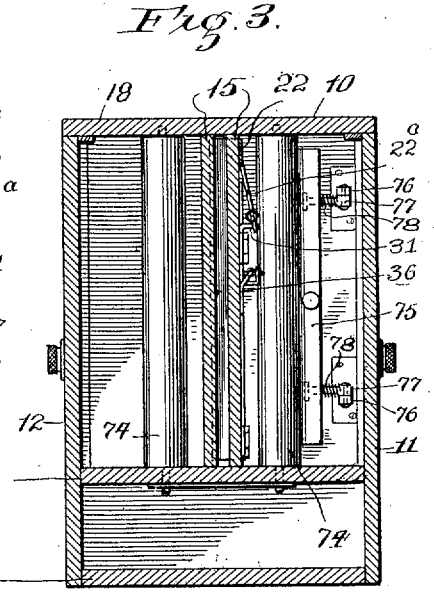

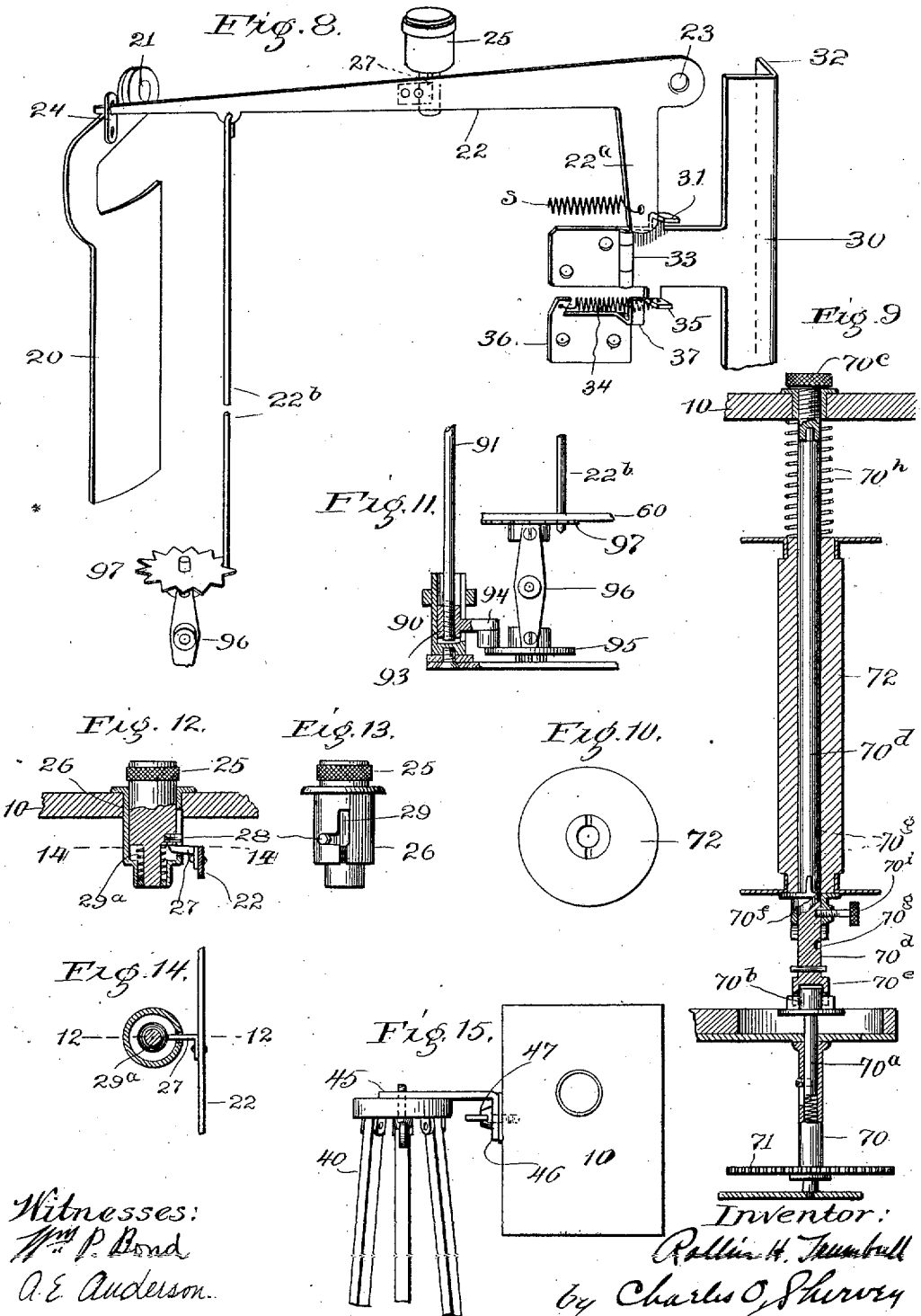

UNITED STATES PATENT OFFICE.

ROLLIN H. TRUMBULL, OF CHICAGO, ILLINOIS.

PANORAMIC CAMERA.

No. 862,596.  Specification of Letters Patent.  Patented Aug. 6, 1907.

Application filed June 30, 1906. Serial No. 324,146.

*To all whom it may concern:*

Be it known that I, ROLLIN H. TRUMBULL, a citizen of the United States, residing in the city of Chicago, in the county of Cook and State of Illinois, have invented certain new and useful Improvements in Panoramic Cameras, of which the following is a full, clear, and exact description.

My invention relates to certain new and useful improvements in panoramic cameras, that is a camera in which the box is revolved about an axis, and the film moved across a narrow slot through which the rays of light are caused to pass. It frequently happens that a moving object comes into the view as the camera is taking the picture and then it becomes desirable to arrest the movement of the camera and simultaneously shut off the light.

One of the objects of my invention is to improve the operation of such devices so as to avoid any light striking upon the film in starting or stopping the camera, and I accomplish this by suitable mechanism which will be hereafter described.

Another object is to provide means whereby films of various widths may be employed in a camera of this type.

Another object is to provide suitable friction upon the film in order that the latter may be drawn squarely across the slot through which the light enters.

To such end the invention consists in certain novel features of construction, the description of which will be found in the following specification; and the more essential features definitely pointed out in the claims appended thereto.

The invention is clearly illustrated in drawings furnished herewith of which

Figure 1 is a perspective view of the camera embodying my improvements. Fig. 2 is a view partly in side elevation and partly in vertical section, the line of section being indicated at 2—2 Fig. 6. Fig. 3 is a vertical cross section in the broken line 3—3, Fig. 2. Fig. 4 is a central vertical section. Fig. 5 is a vertical cross section in the line 5—5, Fig. 4. Fig. 6 is a horizontal section in the line 6—6, Fig. 4. Fig. 7 is an under plan view of the motor. Fig. 8 is a diagrammatical perspective view of the mechanism which controls the light and the motor. Fig. 9 is a detail vertical section of one of the spools and its supporting devices. Fig. 10 is an end view of said spool. Fig. 11 is a detail side view partly in section of the brake mechanism for the governor of the motor. Fig. 12 is a vertical section in the line 12—12 of Fig. 14. Fig. 13 is a side view of a thimble and the push button seen in Fig. 12. Fig. 14 is a horizontal section in the line 14—14, Fig. 12, and Fig. 15 is a side view of a tripod and camera and illustrating a form of the bracket adapted to support the camera in a position in which it revolves upon a horizontal axis.

In these views, 10 represents the inclosing box of the camera which is preferably rectangular in form and is provided with side doors 11—12, through which entrance can be had to the interior of the box. A lens 13 is supported in the front wall 14 of the box, and two walls 15 confine the rays of light passing through said lens, said walls converging toward the rear end where they are but slightly separated so as to form a narrow slot through which the rays of light pass to the film. The rays of light are shut off by a shutter 20 which is hinged to the front wall 14 at 21 and consists preferably of a flat rectangular plate adapted to cover up the lens, except when removed to take a picture. The shutter is oscillated by means of an arm 22 pivoted to one of the walls 15 at 23 and connected to the shutter by means of a link 24. A spring s connected to an arm 22ᵃ of the arm 22 operates to throw the shutter open. A button 25 extends through a thimble 26 in the top of the box and engages with a laterally projecting pin 27 secured to the arm 22. Said push button 25 has a pin 28 which travels in an L shaped slot 29 formed in the wall of the thimble 26 by means of which the push button can be retained in its lower position. By pushing the button down and turning it slightly, the pin 28 will be brought into the horizontal part of the L shaped slot; an upward movement of the button cannot be effected until the button is first turned to bring the pin into the vertical part of the slot. A spring 29ᵃ operates to return the button to its upper position. The arm 22ᵃ engages with a lug 31 formed upon a light shutter 30. Said light shutter has a transversely extending flange 32 which is adapted to close up the narrow slot between the walls 15 and which shutter is actuated simultaneously with the shutter 20 so as to cut off the light at both places, thereby avoiding any danger of light striking the film when the camera is in a position of rest. The shutter 30 is hinged to the wall 15 at 33 and a spring 34 secured to an ear 35 on the shutter 30, and to a plate 36 operates to open the shutter 30 when it is released from the arm 22ᵃ, a lug 37 on the plate 36 acts as a stop to limit the swinging of the plate in one direction.

The camera box is mounted upon a tripod 40 and secured thereto by a screw 41 which passes through the plate of the tripod and is screwed into a gear wheel 50, whereby it may be fastened upon the plate of the tripod so as to be non-rotatable with respect thereto. The gear wheel 50 has an upwardly extending spindle 51 which is journaled in a sleeve 61 which carries a pinion 62 in mesh with gears 63 which form part of the motor 60 that operates to revolve the camera box. Said motor also operates to revolve a spindle 70 through the gear 71 fast upon the spindle 70 which spindle carries the winding spool 72. The film indicated by *a* is originally wound upon a spool 73 and extends around two idle rollers 74 thence around a friction roller 80 and to the winding spool 72. The idle rollers direct the passage of the film across the slot and tension is applied to the film by means of a bar 75 which is pivotally connected to a pair of posts 76 by means of arms 77 which are slidably mounted in the bar 75. Springs 78 interposed between the bar 75 and ears 76 operate to hold the bar 75 in frictional contact with the film. In loading the camera this bar may be swung away from the idle roller 74 and the film threaded around the same, after which the bar may be returned to place. The friction roller 80 is revolved by the film and carries a pinion 81 upon its spindle 80$^a$ which pinion meshes with the gear 50 and the gearing is such as to cause the camera to be revolved at the proper speed relative to the movement of the film across the slot at the end of the walls 15.

The speed of the motor is controlled by a brake mechanism 90, which contains a spindle 91 extending up through the top of the camera box and which is provided with an indicator 92 by which the rate of speed can be told. The spindle 91 of the brake mechanism is threaded in the hub 93 of an arm 94 which bears upon a plate 95 that forms part of a governor 96 of the motor. The movement of the spindle 91 in the proper direction will increase the pressure of the arm upon the plate 95 thereby retarding the movement of the governor, or vice versa. The governor carries upon its upper end a star wheel 97 which if arrested will completely stop the movement of the motor. This star wheel is adapted to be engaged by a rod 22$^b$ secured to the arm 22 and the parts are so arranged that when the shutters are closed the end of said rod will be straddled by two of the teeth of the star wheel 97. When, however, the arm 22 is raised to open the shutters the rod 22$^b$ is disengaged from the star wheel permitting the motor to run.

The spindle 70 is preferably telescopic in form the upper portion 70$^a$ containing a spool engagement device 70$^b$ which contains ears that are adapted to engage with suitable slots formed in the end of the spool 72. When the largest size spool is used, the end thereof is thrust upon the engagement device 70$^b$ and its upper end held in place by a pin 70$^c$ threaded in the top of the box. The two halves of the spindle 70 are spring pressed away from each other longitudinally and in inserting the spool in place upon the engagement devices, the part 70$^a$ may be pressed downward slightly so as to allow the upper end of the spool to be swung in underneath the top of the box. When a shorter spool is to be used an extension spindle 70$^d$ is employed which has a head 70$^e$ for engagement with the spool engaging device 70$^b$ and which is encircled by a sleeve 70$^f$ adapted to be secured to the spindle 70$^d$ by a set screw 70$^t$ which is arranged to enter any one of a number of holes 70$^g$ formed in the spindle 70$^d$. By adjusting the sleeve 70$^f$ to the proper height, a spool of smaller diameter may be properly positioned upon the spindle. A spring 70$^h$ surrounds the spindle 70$^d$ and holds the spool in place upon the sleeve 70$^f$.

Fig. 15 shows a bracket 45 which is adapted to be screwed to the tripod and which contains a portion 46 extending at right angles to the main portion. The camera box may be secured to the portion 46 by a set screw 47 in which case the camera will be caused to rotate upon a horizontal axis in place of rotating upon To guard against the passage of light by the shutter when it is closed, I have provided a strip of material 15$^b$ such as felt or like fabric, which is pasted to the wall adjacent to the shutter. The felt is arranged to lie in close contact with the shutter when closed and effectually prevents the passage of light around the same. This strip of felt is provided with a rectangular opening 15$^a$ through which the light passes. The walls 15 are closed at the top and bottom by the top 18 of the box and a partition 16. In this way no light can enter the light box except through the lens. The motor is confined between the partition 16 and the bottom 17 of the box, and is accessible from either side by opening the doors 11—12.

In operation the camera box is secured in place upon the tripod and when a picture is to be taken the button 25 is released, whereupon the spring s operates to open both shutters and release the motor simultaneously. If it becomes desirable to stop the motor the button 25 is pushed down closing the shutters and arresting the motor and held in such position until it is possible to complete the picture, whereupon the button is again released. When the picture is completed the button is pushed down and turned bringing the pin 28 into the horizontal portion of the slot 29.

I claim as new and desire to secure by Letters Patent:

1. In a panoramic camera the combination with a motor for rotating the camera box and moving the film transversely to the lens, of a shutter, a rotatable member included in said motor, a push button, and a connection between the push button, shutter and rotatable member operated solely by the push button and constructed and arranged to close said shutter and arrest the motor simultaneously.

2. In a panoramic camera the combination with a motor for rotating the camera box and moving the film transversely to the lens, of a lens, a light box having a narrow opening in its rear end, a shutter back of the lens, a second shutter interposed between the slot and film, a push button, connections between the push button and shutters and motor, whereby both shutters will thereby be actuated, and the motor arrested simultaneously.

3. In a panoramic camera the combination with a motor for rotating the camera box and moving the film transversely to the lens, of a lens, a light box having a narrow slot in its rear end, a shutter back of the lens, a second shutter adapted to close said slot, a push button, an arm operated by said push button, and connections between the arm and both shutters and between the arm and motor for operating said shutters and controlling the movement of the motor simultaneously.

4. In a panoramic camera the combination with a motor for rotating the camera box and moving the film transversely to the lens, of a lens, a light box having a narrow slot in its rear end, a shutter back of the lens, a second shutter adapted to close said slot, a push button, an arm operated by said push button, a second arm extending away from said first named arm and adapted to engage the second shutter, connections between the first named arm and first named shutter, and a rod operated by the first named arm and adapted to be thrown into engagement with the motor to arrest the same simultaneously with the closing of the shutters.

5. In a panoramic camera the combination with a motor for rotating the camera box and moving the film transversely to the lens, of a lens, a light box having a narrow slot in its rear end, a shutter back of the lens, a second shutter adapted to close said slot, a push button, an arm operated by said push button, connections between said arm and both of said shutters, a star wheel included in the motor and a rod carried by the arm and adapted to engage said star wheel and arrest the movement of the mo- 6. In a panoramic camera the combination with a motor for rotating the camera box and moving the film transversely to the lens, of a shutter, a push button, means for holding said push button in two positions, and connections between the push button and shutter and motor.

7. In a panoramic camera, the combination with a motor for rotating the camera box and moving the film transversely to the lens, of a shutter, mechanism for simultaneously operating the shutter and controlling the movement of the motor including a button and suitable locking devices whereby said button may be released therefrom to open the shutter and start the motor and subsequently pressed to temporarily close the shutter and stop the motor without resuming its locked position.

8. In a panoramic camera, the combination with a motor for rotating the camera box and moving the film transversely to the lens, of a front and a rear shutter, mechanism for simultaneously operating the shutter and controlling the movement of the motor including a button and suitable locking devices whereby said button may be released therefrom to open the shutter and start the motor and subsequently pressed to temporarily close the shutter and stop the motor without resuming its locked position.

In witness whereof I have signed the above application for Letters Patent at Chicago in the county of Cook and State of Illinois, this 27th day of June, A. D. 1906.

ROLLIN H. TRUMBULL.

Witnesses:
CHARLES O. SHERVEY,
LEONE S. RUSSELL.